United States Patent [19]

Harnden

[11] Patent Number: 4,943,038

[45] Date of Patent: Jul. 24, 1990

[54] TRUSS ASSEMBLY APPARATUS

[75] Inventor: Charles W. Harnden, Fort Lauderdale, Fla.

[73] Assignee: Alpine Engineered Products, Inc., Pompano Beach, Fla.

[21] Appl. No.: 380,588

[22] Filed: Jul. 17, 1989

[51] Int. Cl.$^5$ .............................................. B30B 3/02
[52] U.S. Cl. ...................................... 269/37; 269/910; 269/320; 29/281.3
[58] Field of Search ............... 100/210, DIG. 13, 100, 100/218, 173, 153, 155; 227/152; 144/288 R, 288 C; 269/303, 37, 315, DIG. 910, 296, 301, 319-320; 29/281.1, 281.3

[56] References Cited

U.S. PATENT DOCUMENTS

| | | |
|---|---|---|
| 604,160 | 5/1898 | Reissmann .......................... 269/112 |
| 2,212,421 | 8/1940 | Henderson . | |
| 2,919,733 | 1/1960 | Johnson ............................. 269/910 |
| 3,068,484 | 12/1962 | Moehlenpah et al. . | |
| 3,371,921 | 3/1968 | Hollomon et al. .................. 269/910 |
| 3,693,542 | 9/1972 | Moehlenpah ....................... 269/910 |
| 4,084,498 | 4/1978 | Weaver ............................... 269/910 |
| 4,154,436 | 5/1979 | Sellers ................................. 269/14 |
| 4,567,821 | 2/1986 | McDonald . | |

Primary Examiner—Robert C. Watson
Attorney, Agent, or Firm—Oltman and Flynn

[57] ABSTRACT

A truss assembly table having a plurality of sections in succession along its length separated by openings. Each section of the table has several panels in succession separated by openings which extend across the table. Below each opening between the panels, a lead screw drives a carrier which supports a jig stop projecting above the top of the table. Each lead screw is driven by a manually-controlled power-operated device for positioning the corresponding jig stop at a selected position across the table. Power-operated lifts at the openings between sections of the table can be raised to lift a completed truss above the top of the jig stops so that it can be slid off the table laterally.

8 Claims, 7 Drawing Sheets

TRUSS ASSEMBLY APPARATUS

The invention relates to an apparatus for assembling wood structures, in particular wood trusses for roofs.

BACKGROUND AND PRIOR ART

The introduction of prefabricated wood trusses has made modern construction faster and more efficient. The wood trusses are assembled in factories equipped with machinery for mass-fabricating the individual truss components, which are assembled on large assembly tables, before they are shipped to the construction sites. According to the conventional art the most time-consuming part of truss fabrication is the assembly process.

Various types of jigs and/or mechanized assembly tables have been proposed heretofore to facilitate the assembly of the wood trusses. U.S. Pat. No. 2,212,421 shows an assembly table for wood structures having a table surface equipped for receiving templates at preselected locations, which in turn serve to position the truss components on the table before securing the joints of the truss with ready-made metal connectors. U.S. Pat. No. 3,068,484 shows an apparatus for fabricating wood structures which includes clamping of the truss parts in a fixture before inserting the metal connectors. U.S. Pat. No. 4,567,821 shows an apparatus for assembling wood trusses which includes a frame supporting a clamp table with an adjustable grid that holds the truss components in place before securing the truss joints.

The assembly arrangements according to the prior art suffer from the drawback that the erection or preparing of the assembly jig before truss fabrication can begin is cumbersome and time consuming. It is accordingly an object of the instant invention to provide a truss assembly table equipped with a novel power-operated arrangement for positioning a plurality of jig stops in the assembly table which overcomes the drawbacks of the known apparatus and jigs for truss assembly.

SUMMARY OF THE INVENTION

According to the instant invention, there is provided a truss assembly apparatus with a table composed of similar table sections, each having a plurality of table panels. The table sections are spaced apart by elongated openings and the table panels in each section are separated by narrower elongated openings. A plurality of laterally adjustable jig stops are located at the openings between the panels of each section of the assembly table. The jig stops are individually adjustable along these openings by corresponding lead screws driven by a power-operated device, preferably a stepper motor but alternatively a power operated drill, either electric or pneumatic. Each lead screw is rotated a predetermined amount to position its jig stop at a predetermined location across the assembly table in accordance with a specified truss design. A counter monitors the position of each jig stop and the operator stops the corresponding lead screw when the jig stop is at the correct position specified in accordance with the truss design.

A principal object of this invention is to provide a novel truss assembly apparatus including a table and jig stops that are selectively positionable on the table by manually-controlled power-operated devices.

Another object of this invention is to provide a novel truss assembly apparatus having a table with a plurality of sections in succession separated by openings which receive power-operated lift devices, and each section having a plurality of panels in succession separated by openings in which jig stops are selectively adjustable.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
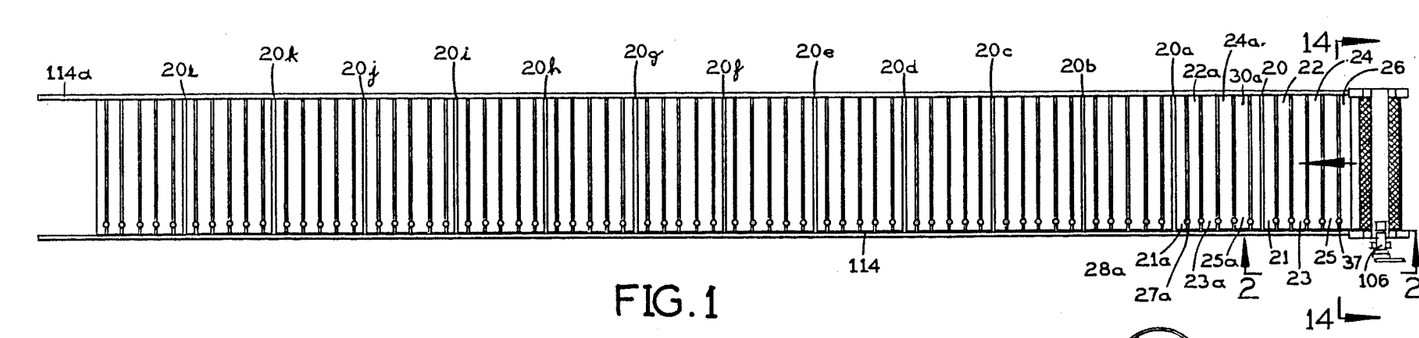
FIG. 1 is a top plan view of a truss assembly table with a user-controlled power-operated setup jigging system in accordance with the present invention.

Referring first to FIG. 1, the present apparatus has a truss assembly table which is elongated from left to right in this Figure. The table has several sections arranged end to end and separated by elongated openings 20,20a,20b,20c,20d,20e, 20f,20g,20h,20i,20j,20k and 20l, each of which extends from front to back across the table. To the right of opening 20, the table section has a series of flat horizontal panels 21,22,23,24,25 and 26 separated by elongated openings 27,28,29,30 and 31 (FIG. 2) which are narrower than the openings 20,20a, etc. between the table sections. In this table section the panels 21 and 26 at its opposite ends are substantially narrower than the panels 22,23,24 and 25 between them.

The panels and the openings in the table section to the right of the openings 20a are given the same reference numerals, but with an "a" suffix added, as those of the table section to the right of opening 20. This is also true for each of the other table sections, but with the corresponding letter suffix added to the reference numeral for each panel or opening in the table section.

A jack or lift 32 (FIG. 2) is vertically displaceable in the opening 20 between the two table sections near the right end in FIG. 1. Similarly, the other openings 20a,20b,20c,20d, 20e,20f,20g,20h,20i,20j,20k and 20l between neighboring sections of the table receive respective vertically displaceable jacks or lifts. The construction and mode of operation of each of these jacks of lifts is described in detail hereinafter with reference to FIGS. 9–11.

The opening 27 (FIG. 1) in the right-hand table section between table panels 21 and 22 slidably reveives a jig stop 33, which is selectively adjustable along this opening, as described hereinafter. Similarly, a jig stop 31 is slidably adjustable along the next opening 28 to the right, a jig stop 35 is slidably adjustable along the opening 29, and a jib stop 36 is slidably adjustable along the opening 30, and a jig stop 37 is slidably adjustable along the opening 31 in this section of the table.

Figure 5:
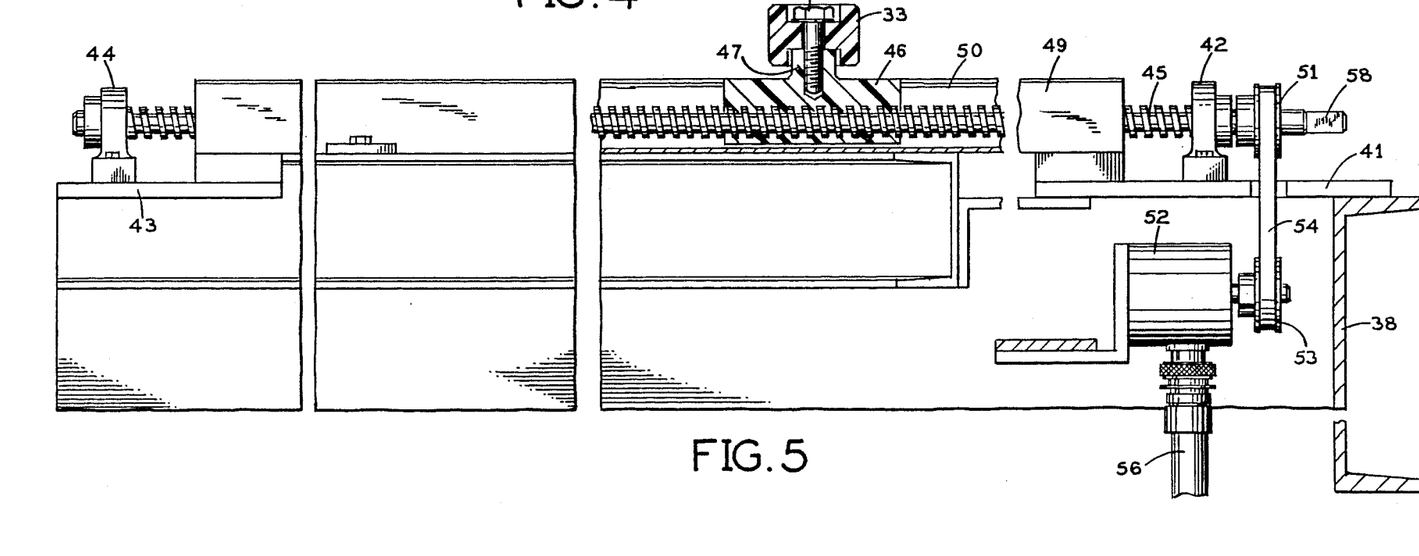
FIG. 5 is a view of the FIG. 4 mechanism, partly in side elevation and partly in section.

With one exception, each of the other table sections has four slidably adjustable jig stops, similarly numbered 33,34,35,36 and 37 with the letter suffix (a,b,c, etc.) of that table section added. Each of these jig stops is a roller ratatably mounted on a short vertical shaft and having a cylindrical periphery except at the top and bottom where it is beveled as shown for the jig stop 33 in FIG. 5.

One table section has a special jig stop S (FIGS. 13 and 14) which is V-shaped instead of being a roller. This special jig stop is used at the peak of the truss, where the two oppositely inclined truss members that will be directly below the roof adjoin one another.

Each section of the table is rigidly supported at a predetermined height above the floor by a framework F having front and rear channels running horizontally lengthwise of the table, end channels running horizontally between the front and rear channels at opposite ends of the table section, a central longitudinal I beam located midway between the front and rear channels and extending parallel to them and horizontal cross members extending between the front and rear channels at intervals along the length of the table section between its opposite end channels. The front channel 38 appears in FIG. 2, as do the opposite end channels 39 and 40.

Figure 6:
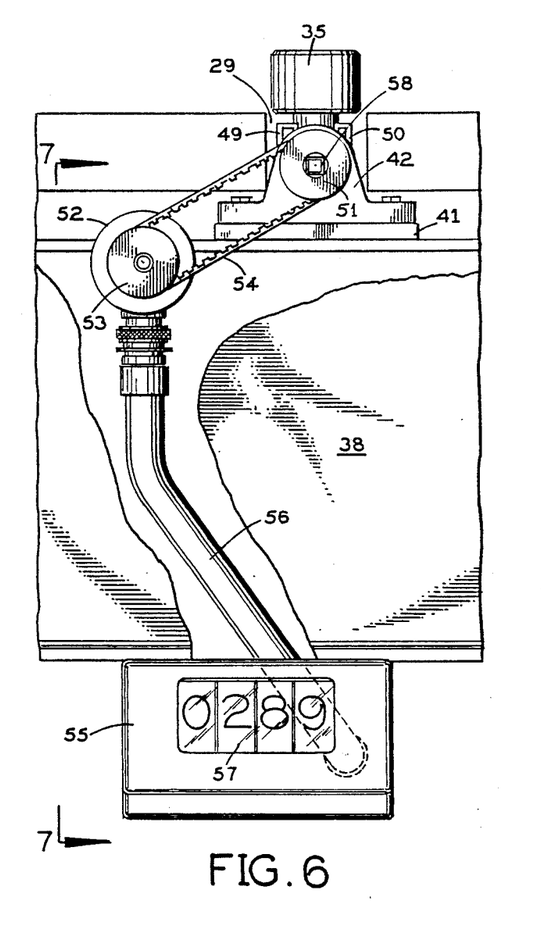
FIG. 6 is a fragmentary end elevation of this mechanism viewed from the right end in FIG. 4.
Figure 7:
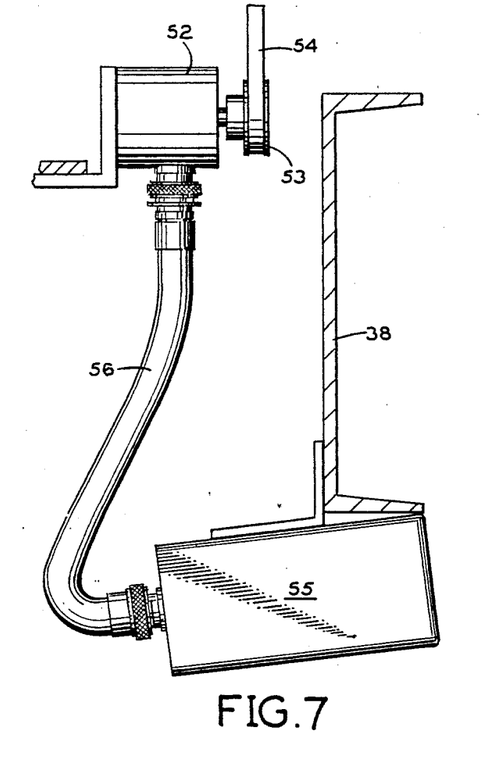
FIG. 7 is a vertical cross-section taken along the line 7—7 in FIG. 6.

Just behind the front channel 38, a horizontal plate 41 (FIG. 5) rigidly supports a plurality of bearing housings 42, one below each of the openings 27–31 between neighboring panels 21–26 of a particular table section. Just in front of the rear channel of the framework a horizontal plate 43 rigidly supports a plurality of bearing housings 44, one below each opening 27–31. Each bearing housing 42 and 44 supports anti-friction bearings for a lead screw 45. An internally screw-threaded jig stop carrier 46 on each lead screw carries the corresponding jig stop (e.g., 33 in FIG. 5). The carrier 46 has a cylindrical stub 47 on top with a screw-threaded blind opening that receives a bolt 48 attaching the jig stop (e.g., 33 in FIG. 5) to the carrier. Each carrier 46 is slidably received between opposed guide channels 49 and 50 (FIG. 6). With this arrangement, each lead screw 45 is rotated to move the corresponding jig stop 33,34,35,36 or 37 along the corresponding slot 27,28,29, 30,31 or 32 to any selected position between the front and back of the truss assembly table.

Each lead screw 45 carries a pulley 51 in front of the front bearing housing 42. A correponding rotopulser 52 has a drive pulley 53 on its output shaft which is drivingly coupled to the lead screw pulley through an endless flexible timing belt 54. A corresponding counter 55 of known design is connected electrically at each rotopulser 52 through a cable 55. Each counter 55 presents a visible display 57 that can be seen at the front of the truss assembly table. The number displayed by the counter tells the front-to-back positon of the corresponding jig stop 33,34,35,36 or 37 along the opening 27,28,29,30 or 31 in the table section where that jig stop is located.

Each lead screw 45 has a stub 58 of square cross-section for engagement by a socket wrench 59 (FIG. 8) driven by a power-operated hand drill 60, which may be either an electric drill or a pneumatic drill.

At each of the other table sections the jig stops are numbered 33,34,35,36 and 37, with the appropriate letter suffix, are each individually adjustable along the respective openings in that table section numbered 27,28,29,30 and 31, with the corresponding letter suffix.

Figure 9:
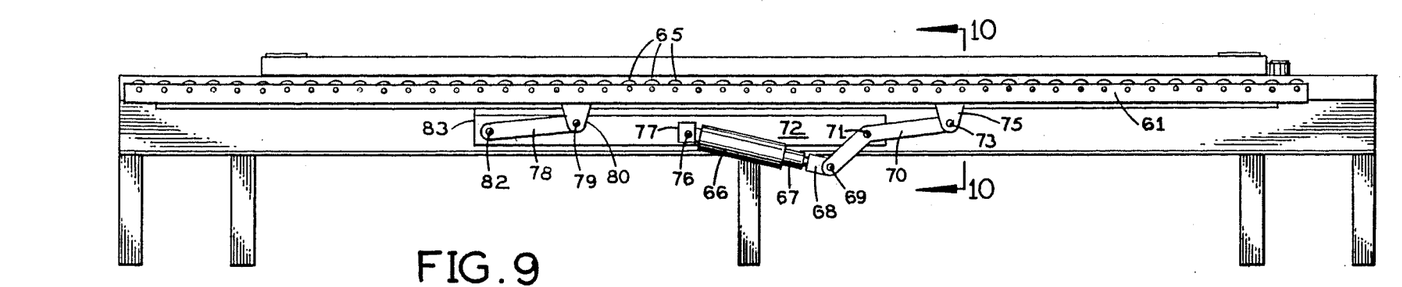
FIG. 9 is a vertical longitudinal section taken along the line 9—9 in FIG. 3 and showing the conveyor rollers in this section of the truss assembly table in their normal lowered position.
Figures 10, 11:
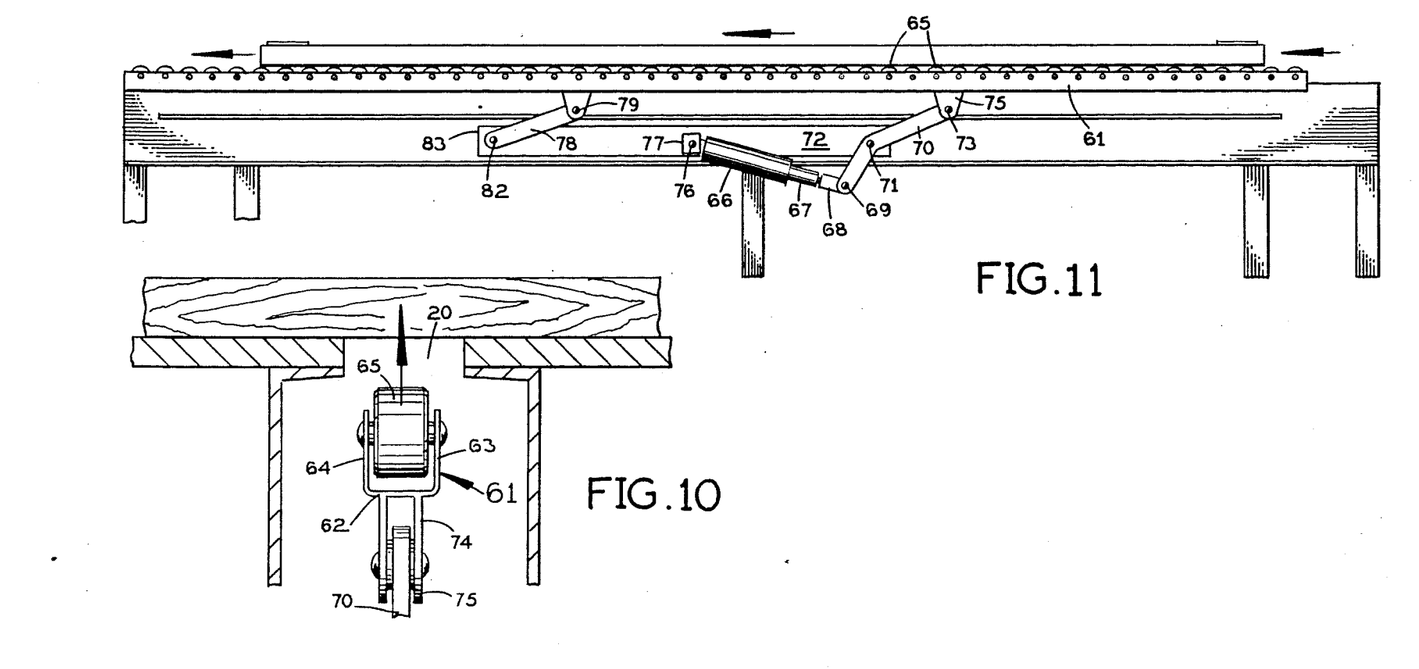
FIG. 10 is a vertical cross-section taken along the line 10—10 in FIG. 9.
FIG. 11 is a view like FIG. 9 with the conveyor rollers in this table section raised.

FIGS. 9–11 show the jack or lift located at an opening 20 in the table between table sections. This jack or lift has a horizontally elongated roller carrier 61 of channel-shaped cross-section (FIG. 10) with a flat horizontal bottom wall 62 extending between upstanding, vertical, opposite side walls 63 and 64. A plurality of cylindrical conveyor rollers 65 are rotatably supported individually by roller carrier 61, and they project up past the top edges of the side walls 63 and 64 of the roller carrier. Normally, as shown in FIGS. 9 and 10, the tops of the rollers 65 are slightly below the level of the top surfaces of the table panels on opposite sides of the opening between neighboring sections of the table. In FIG. 10, these are the panels 26a and 21 on opposite sides of the opening 20 between the table section farthest to the right in FIG. 1 and the next table section to the left of it. As shown in FIG. 11, the roller carrier 61 may be raised to a position in which the tops or rollers 65 are above the level of the tops of the jig stops.

The roller carrier 61 is raised and lowered by an air cylinder 66 operating a reciprocable piston connected to a piston rod 67 which extends out slidably through the right end of cylinder 66 in FIGS. 9 and 11. A rigid linkage arm 68 extends out from the piston rod and is pivotally connected at 69 to the lower end of a lever 70 which is bent to form an angle of about 135 degrees. At the bend in lever 70 it is pivotally mounted at 71 on a horizontally elongated, fixedly positioned, support block 72. At its right end in FIGS. 9 and 11 the lever 70 is pivotally connected at 73 to a pair of ears 74 and 75 (FIG. 9) which extend down from the roller carrier 61. The opposite end of the air cylinder 66 from its piston rod 67 is pivoted at 76 to fixed support block 77. To the left of the air cylinder 66 in FIGS. 9 and 11, a straight linkage arm 78 is pivoted at its right end, at 79, to a pair of ears 80 extending down from roller carrier 61 and is pivoted at its right end, at 82, to a fixed support block 83.

FIGS. 9 and 10 show the normal position of the parts, in which the piston rod 67 is retracted, holding the remote end of lever 70 (at pivot 73) down to position the tops of the conveyor rollers 65 below the top surface of the table.

FIG. 11 shows the position of the parts as a result of the introduction of pressurized air into the left end of cylinder 66, which causes piston rod 67 to move out to an extended position, rocking lever 70 counterclockwise and raising its end at 73 to push the roller carrier 61 up to a position in which the tops of the conveyor rollers 65 are above the level of the tops of all the jig stops 33,34,35,36 and 37 on this section of the truss assembly table.

The jack or lift at each of the other openings 20a,20b, 20d,20e,20f,20g,20h,20i,20j,20k, and 20l between the neighboring sections of the table is identical to the one just described.

Figure 12:
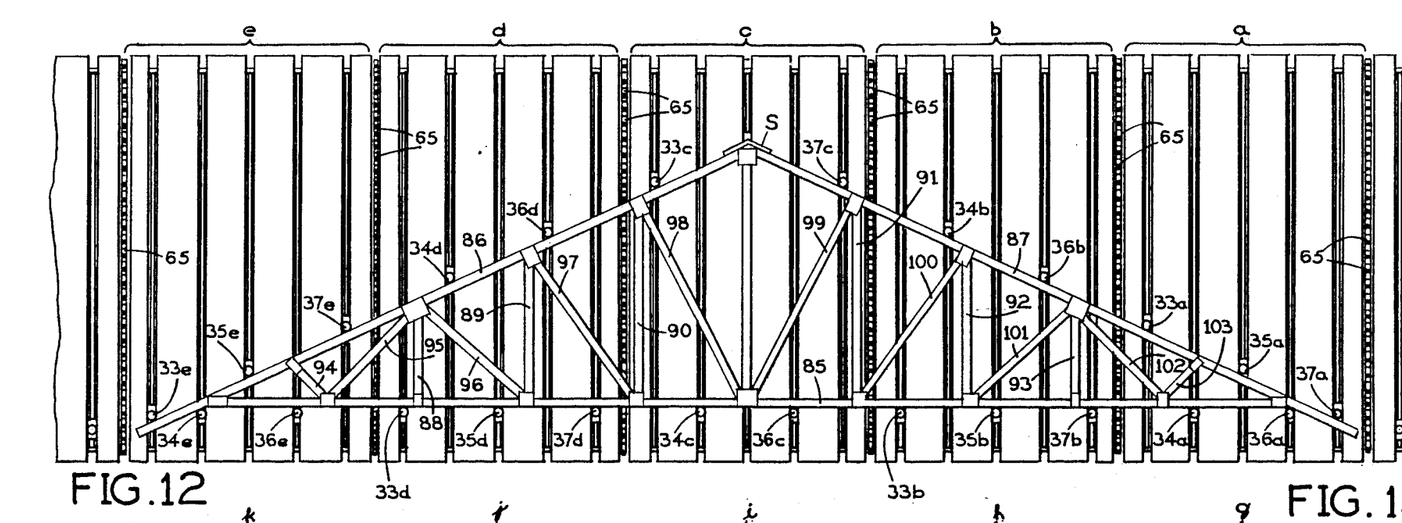
FIG. 12 is a top plan view showing a roof truss of one design assembled on the truss assembly table of the present invention.

FIG. 12 shows how the jig stops in the present system are positioned to engage the outside of a truss of known design, which has a cross beam 85 and a pair of oppositely inclined beams 86 and 87 extending in from opposite ends of the cross beam 85 and adjoining each other at the inner end of each end, forming a V. Each inclined beam 86 and 87 also extends a short distance beyond the adjacent ends of the cross beam 85. The truss also has a series of straight, parallel pieces 88,89 and 90 on the inside, which extend perpendicularly from cross beam 85 to one inclined beam 86, and a series of straight, parallel pieces 91,92 and 93 on the inside, which extend from the cross beam 85 to the other inclined beam 87. The truss also has diagonal members on the inside, numbered 94,95,96,97,98,99,100,101,102 and 103 from left to right in FIG. 13.

In FIG. 12, the parts of the truss are positioned on the a,b,c,d and e sections of the present truss assembly table.

As shown in FIG. 12, before being attached to each other, the pieces of the truss are fitted together as they will be after they are attached to each other. From left to right in this Figure, the cross beam 85 of the truss is engaged on the outside by the roller-type jig stops 36e, 33d,35d,37d, 34c,36c, 33b,35b,37b and 34a. The inclined beam 86 of the truss on the left side of FIG. 11 is engaged on the outside by the roller-type jig stops 33e,35e,37e,34d,36d and 33c. The oppositely inclined beam 87 of the truss is engaged on the outside by the roller-type jig stops 37c,34b,36b,33a,35a and 37a. The special V-shaped jig stop S engages the inclined beams 86 and 87 where they adjoin each other. At the extreme left end of the truss in FIG. 12, the overhanging part of the inclined beam 86 is engaged by the roller-type jig stop 34e on what will be the lower face of this beam when it is in place on a building. Similarly, a roller-type jig stop 36a engages the overhanging part of the other inclined beam 87 on what will be the lower face of this beam.

It will be apparent that the outside pieces of the truss are firmly held in place by the jig stops which engage the outside of the truss on opposite sides in alternate sequence from left to right across the truss. Thus, for example, jig stop 36e engages the truss on the outside of the cross beam 85, whereas the next jig stops 35e and 37e on opposite sides of jig stop 36e engage the truss on the outside of the inclined beam 86.

Figure 13:
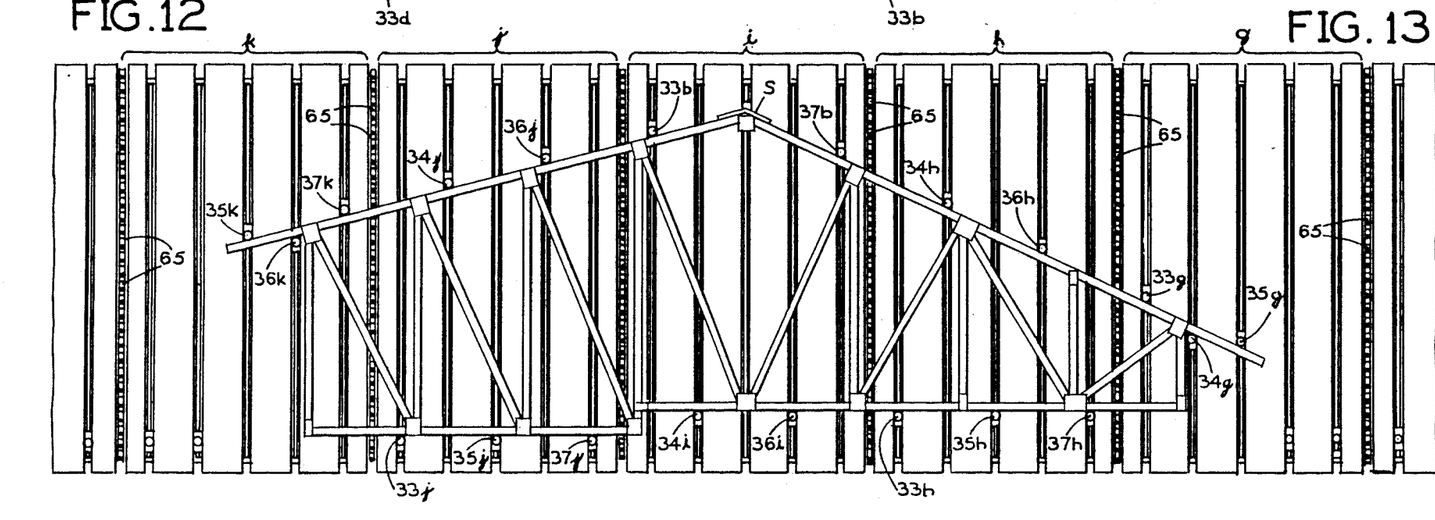
FIG. 13 is a view like FIG. 12 and showing a roof truss of a different design.

FIG. 13 shows the jig stops in the present system positioned to engage the outside of a truss of substantially different design from the truss shown in FIG. 12. The opposite sides of this truss are engaged by the jig stops in alternate sequence from left to right across the truss to hold the truss pieces in position with maximum security against accidental displacement. This second truss is shown on sections g,h,i,j and k of the same table whose sections a,b,c,d and e are used in FIG. 12. Thus, more than one truss can be assembled on the table at any given time.

The present system includes a gantry assembly of known design for forcing the usual metal connectors down into the wood truss pieces where they adjoin. Preferably, this gantry assembly is a "ROLL-A-MASTER" manufactured and sold by the assignee of the present invention.

Figure 2:
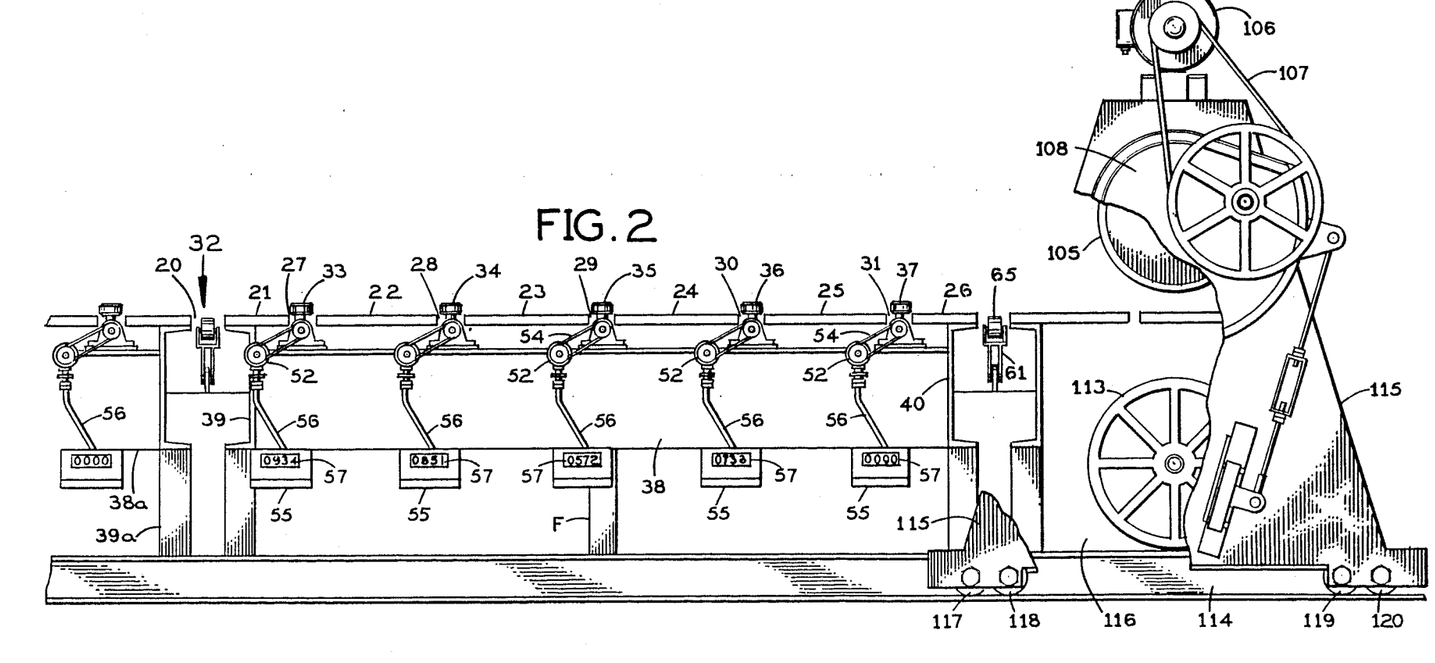
FIG. 2 is a partial front elevation taken from the line 2—2 in FIG. 1.
Figure 14:
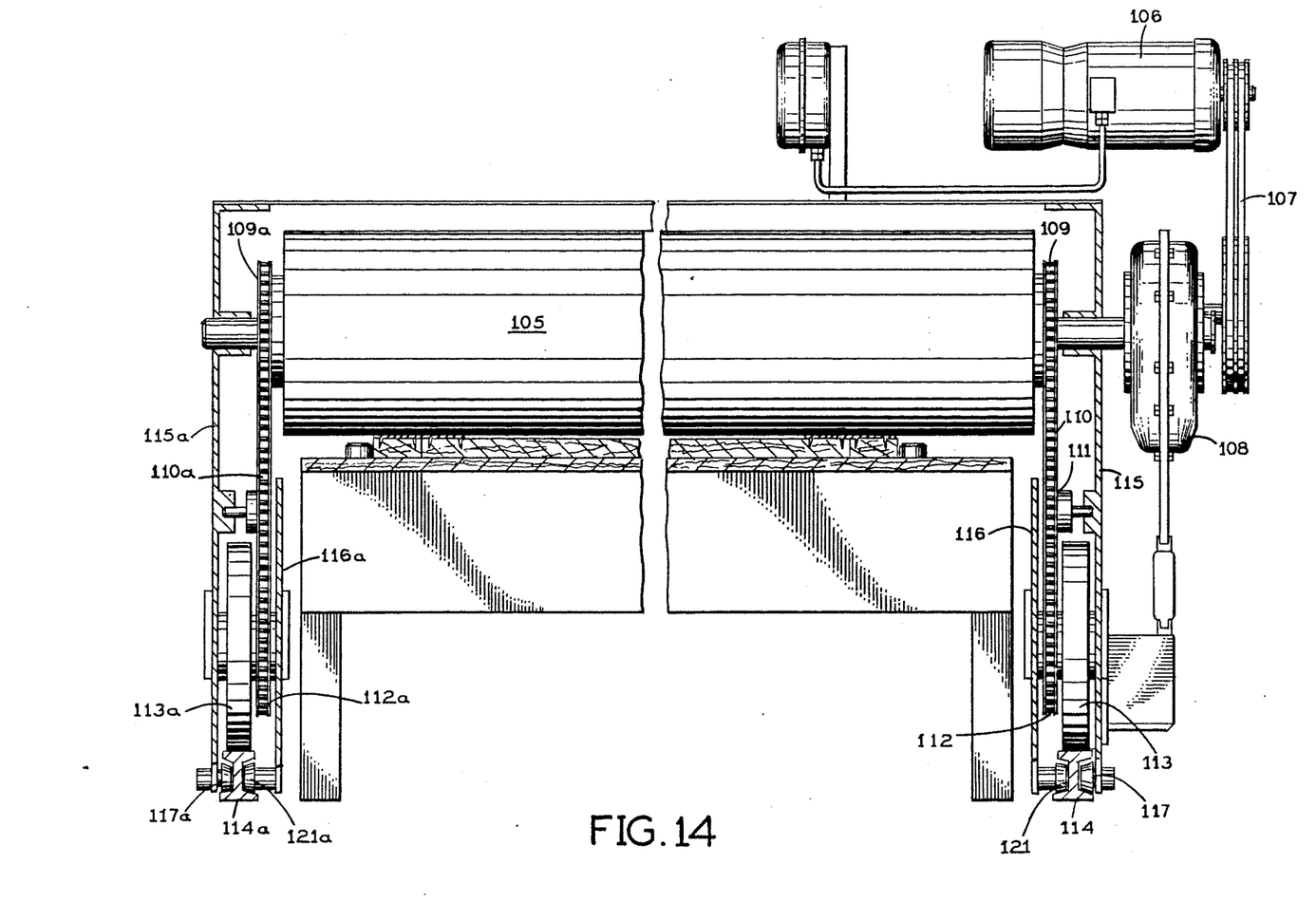
FIG. 14 is a vertical cross-section taken along the line 14—14 in FIG. 1.

As shown in FIGS. 2 and 14, this gantry assembly includes a large diameter horizontal roller 105 overlying the truss assembly table and an electric motor 106 driving the roller 105 through a pair or belts 107 and a gear reduction 108.

At its right end in FIG. 14 the roller 105 carries a gear 109 which drives an endless flexible chain 110 that passes across an idler gear 111 and then around a lower gear 12 affixed to a drive wheel 113 that rolls along the top of a rail 114 on the floor of the building where the present truss assembly system is located. A shown in FIG. 1, rail 114 is at the front of the truss assembly table.

A similar drive arrangement is located at the opposite end of roller 105. Corresponding elements of this drive arrangement have the same reference numerals, with an "a" suffix added, as the elements of the drive arrangement at the right end of roller 105 in FIG. 14.

Figure 3:
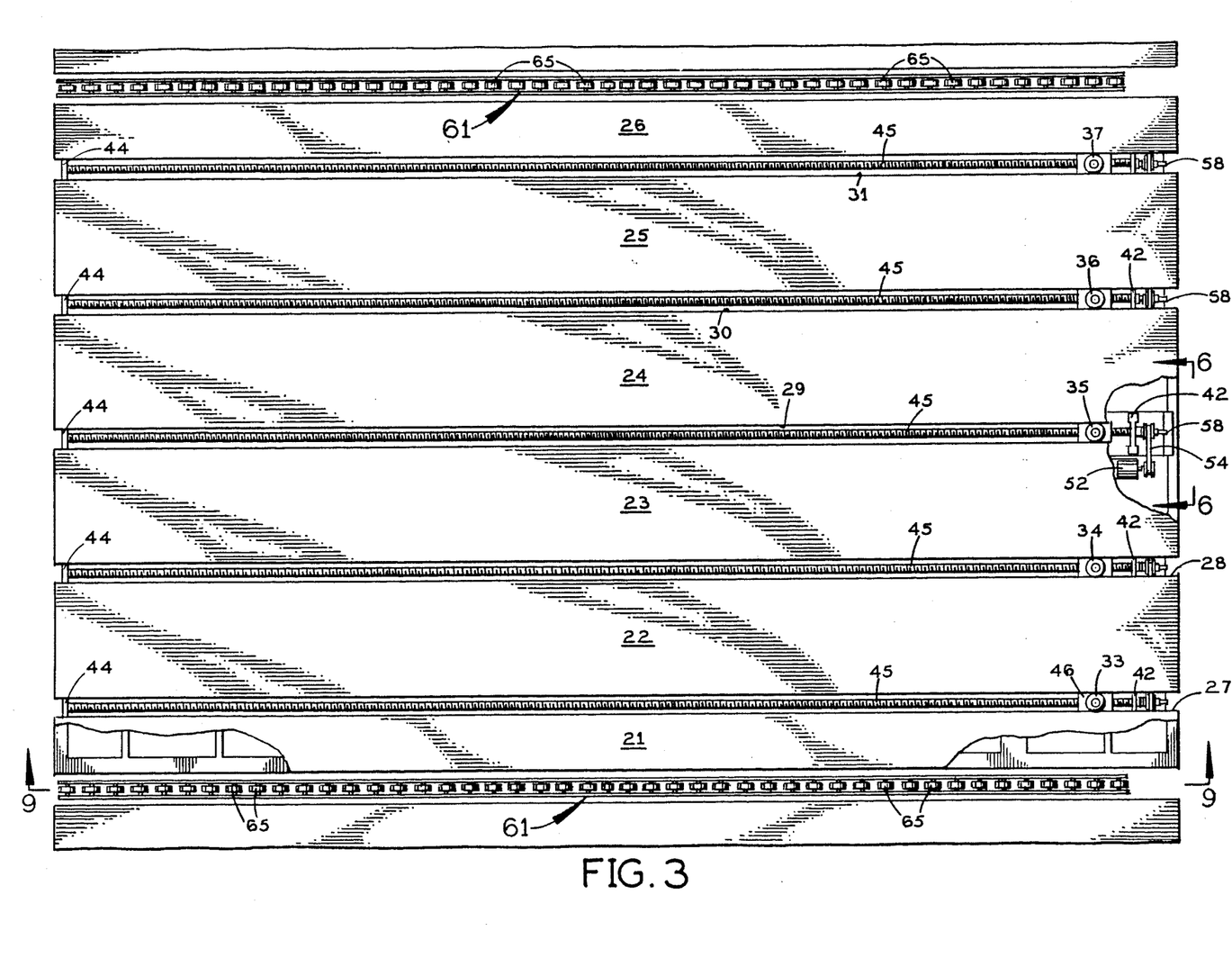
FIG. 3 is a top plan view, with parts broken away for clarity, of one section of the present truss assembly table.
Figure 4:
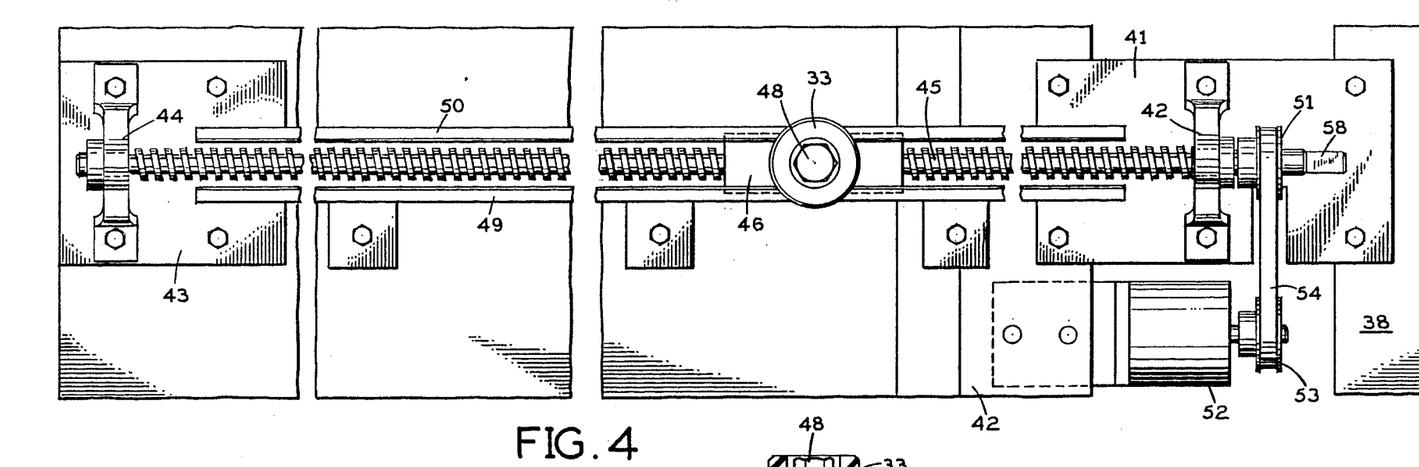
FIG. 4 is an enlarged top plan view of the motor-operated mechanism for positioning one of the jig stops in one section of the truss assembly table, with parts broken away.

At its right end in FIG. 14 the housing or frame of the gantry assembly has a vertical outer wall 115, which at its opposite ends (FIG. 2) extends down outside the rail 114, and a vertical inner wall 116 (FIG. 3) which extends down inside this rail. The outer wall 115 rotatably supports four rollers 117, 118,119 and 120 (FIG. 2) which extend into the longitudinal recess on the outside of rail 114 and engage the top surface of the bottom web of this rail, as shown in FIG. 14 for roller 117. The inner wall 116 rotatably supports four similar rollers, one of which is shown at 121 in FIG. 14, which similarly engage rail 114 at the inside.

Likewise, at the back side (the left end in FIG. 14) the housing or frame of the gantry assembly has outer and inner walls 115a and 116a, each of which rotatably supports four rollers that engage the rail 14a on opposite sides. One outside roller 117a and one inside roller 121a appear in FIG. 14.

When the motor 106 is on, it drives the drive wheels 113 and 113a, which roll along the top of the rails 114 and 114a, and the rollers carried by the outer and inner walls 115,116,115a and 116a at the opposite ends of the gantry assembly guide the gantry's movement along these rails. Motor 106 also rotates the roller 105, which presses the metal connectors down into the wood truss members to join them into a unitary, substantially rigid structure as the gantry assembly rolls along rails 114 and 114a and roller 105 passes over the truss assembly table.

Figure 8:
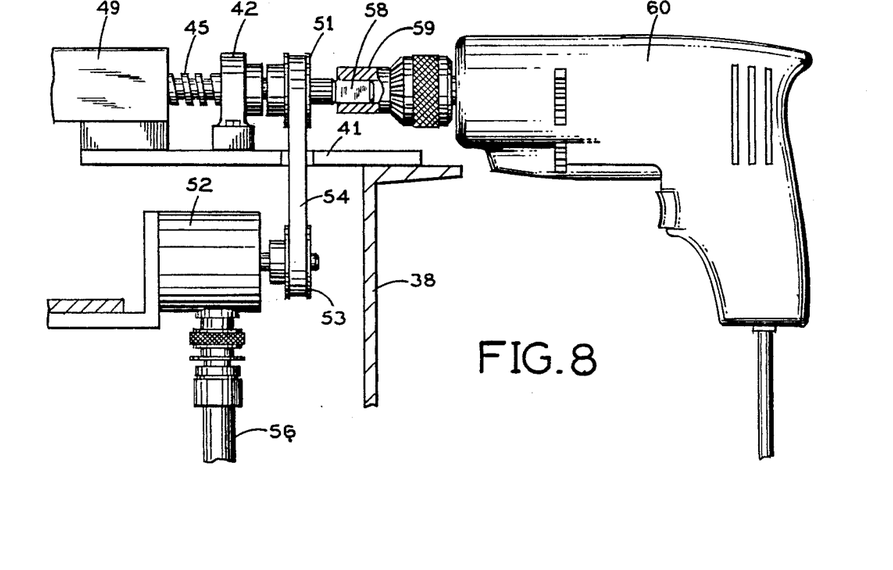
FIG. 8 is a view like part of FIG. 5 and showing a power drill for positioning the jig stop in this mechanism.

In the use of this truss assembly table, all the jig stops numbered 33–37 in each section of the table that will be used to position the parts of the truss are moved to predetermined positions individually by their power-operated drill 60 (FIG. 8).

Where the electric rotopulser 52 is used, these positions are reflected by the numbers appearing in the visual displays 57 associated with the individual counters 55 for the motors. Therefore, a particular truss design is established by the display numbers assigned to the various openings numbered 24–31 in the table sections that will be used for a particular truss. The various parts of the truss are placed next to the jig stops numbered 33–37 in these table sections which are now positioned in accordance with the numbers assigned to their respective drive motors 52 and now displayed by the corresponding counters 56.

The connector plates are placed on top of the properly positioned truss members where they adjoin each ohter. Then the gantry motor 106 is turned on and the gantry roller 105 rolls over the table from right to left in FIGS. 1,12 and 13 to press these connector plates into the truss members and thereby connect the previously separate truss members into a rigid unit.

After the truss has been assembled and the gantry roller has returned, with the metal connectors pressed into the wood truss members where they adjoin one another, the air cylinder 66 (FIG. 9) for each jack or lift at the openings 20,20a,20b 20c, etc. between neighboring sections of the table is actuated so that all of these jacks move up to the position shown in FIG. 11, raising the tops of the conveyor rollers 65 above the level of the tops of the jig stops numbered 33–37. Then a worker pushes the finished truss across these conveyor rollers to another conveyor (not shown) on the back side of the table.

I claim:

1. A truss assembly table having a length and a width comprising:
   a plurality of table sections in succession along the length of the table with openings between the sections extending across the width of the table, each of said table sections having a plurality of panels in succession lengthwise of the table separated by openings extending across the width of the table;
   a plurality of lead screws extending across the width of the table along and below the openings between said panels;
   manually-controlled power-operated means for individually rotating the lead screws;
   a plurality of jig stop carriers threadedly coupled individually to said lead screws and movable along said openings between said panels across the width of the table in response to rotation of the corresponding lead screws;
   a plurality of jig stops connected individually to said carriers and projecting above the top of the table above said openings between said panels;
   and a plurality of power-operated lifts at said openings between said table sections, said lifts being movable upward to raise a completed truss above the top of the jig stops.

2. A truss assembly table according to claim 1 wherein said power-operated means for rotating the lead screws in a plurality of reversible electric drill motors.

3. A truss assembly table according to claim 1 wherein said power operated means comprises stepper motors.

4. A truss assembly table according to claim 3 wherein in said lifts have rollers at the top for engaging a completed truss from below to facilitate sliding the truss laterally off the assembly table.

5. A truss assembly table according to claim 1 wherein in said lead screws have end projections thereon for driving engagement by a power-operated drill.

6. A truss assembly table according to claim 5 wherein said lifts have rollers at the top for engaging a completed truss from below to facilitate sliding the truss laterally off the table 7. A truss assembly table comprising:
   a plurality of table panels in succession along the table separated by openings extending across the table;
   a plurality of jig stops located individually at said openings and projecting above the top of the table panels;
   a manually-controlled power-operated positioning means for selectively positioning said jig stops along said openings;
   a plurality of lifts positioned at intervals along the table, each of said lifts being movable between a lowered position below the top of the table and a raised position projecting above the top of the jig stops;
   and power-operated means for raising and lowering said lifts.

8. A truss assembly table according to claim 7 and having a plurality of sections in succession along the table, each of said sections having a plurality of said table panels therein and said sections being separated by openings, and wherein said lifts are located at said openings between said table sections.

* * * * *